F. A. SWEET.
CAR WHEEL.
APPLICATION FILED MAR. 11, 1920.

1,344,460.

Patented June 22, 1920.
2 SHEETS—SHEET 1.

F. A. SWEET.
CAR WHEEL.
APPLICATION FILED MAR. 11, 1920.
1,344,460.
Patented June 22, 1920.
2 SHEETS—SHEET 2.
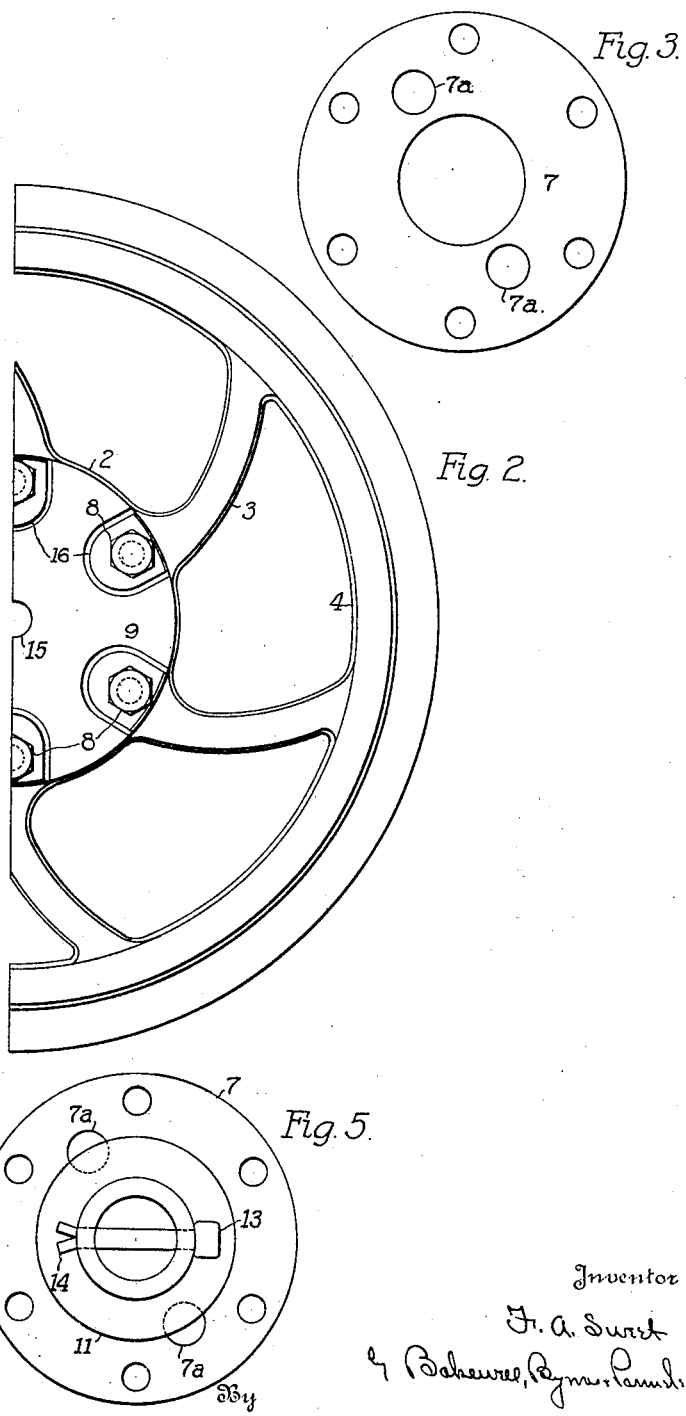

UNITED STATES PATENT OFFICE.

FREDERICK A. SWEET, OF SALT LAKE CITY, UTAH.

CAR-WHEEL.

1,344,460. Specification of Letters Patent. Patented June 22, 1920.

Application filed March 11, 1920. Serial No. 364,917.

*To all whom it may concern:*

Be it known that I, FREDERICK A. SWEET, residing at Salt Lake City, Salt Lake county, Utah, have invented a new and useful Improvement in Car-Wheels, of which the following is a full, clear, and exact description, reference being had to the accompanying drawings, forming part of this specification, in which—

Fig. 2 is a face view of one-half of the wheel;

Fig. 3 is a face view of a thrust ring;

Fig. 4 is a sectional view showing an assembly of the thrust members; and

Fig. 5 is an end view of the thrust members with the hub cap removed.

Figure 1:
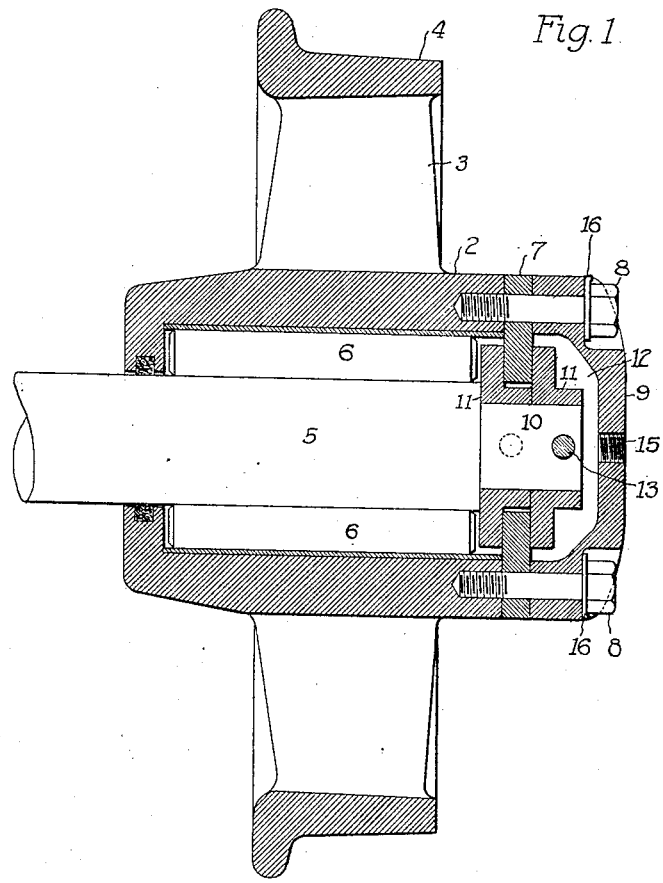
Figure 1 is a diametrical section of a car wheel embodying my invention.

My invention has relation to car wheels, and more particularly to mine car wheels.

The object of my invention is to provide a wheel having means of novel and efficient character which will effectively take up the outward and inward side thrusts of the axles and in which the thrust parts may be made of some high grade material, such as carbonized steel, capable of withstanding severe wearing action.

My invention also provides a car wheel in which certain of the thrust members are interchangeable, so that in case of wear, the position of the parts may be interchanged to compensate therefor.

My invention also provides a wheel having a lubricant reservoir with means whereby it may be readily filled and by which the lubricant is effectively distributed within the wheel hub. Other objects and advantages of my invention will hereinafter appear.

Referring to the accompanying drawings, in which I have shown the preferred embodiment of my invention, and which will now be described, the numeral 2 designates the hub of the wheel which is cast integrally with the spokes 3 and rim 4 of cast iron or other suitable metal. 5 designates the axle and 6 suitable bearings within the hub, these bearings in the present instance being in the form of rollers.

In accordance with my invention, the outer end face of the hub is surfaced off, either in a boring mill or on a lathe, and a steel thrust ring 7 is placed against this faced end and is secured in place by a plurality of cap screws 8, which also secure the hub cap 9. The thrust ring 7 is thus seated and secured between the hub body and cap, both the ring and cap being held by the screws 8.

The inner face of the hub is recessed to receive the reduced end portion 10 of the axle, together with the thrust collars 11 and also to provide a lubricant-containing space or chamber 12. Each of the collars 11 consists of a hub portion and a flange portion, the inner collar being seated against the shoulder of the axle and its hub portion forming a spacer against which the flange portion of the outer collar is seated. The flanges of the two collars form between them a space for the thrust ring 7. The outer collar is secured to the reduced portion 10 of the axle by a suitable pin 13, whose end may be split, as indicated at 14, in Fig. 5, in order to prevent its working loose.

The two collars 11 are preferably made exact duplicates of each other, both being provided with a hole for the pin 13. The purpose of this is to make them interchangeable so that in case of wear, they may be taken off, the inside ring put on the outside and the outside ring put on the inside.

The ring 7 is also formed with openings 7ª, therethrough, through which lubricant introduced into the chamber 12 may find its way through the thrust ring to the bearings, and thereby give an effective distribution of the lubricant beyond the thrust bearing. This lubricant may be introduced through a hole 15 in the hub cap, which can normally be closed by a removable plug.

The heads of the cap screws 8 are preferably seated in recesses 9, cast in the hub cap, and which are of such form that a washer 16, seated therein beneath the screw heads will be prevented from turning. When the cap screw has been tightened up, the edge portions of the washer can be bent up against the screw heads, thus making a positive lock which will prevent the cap screws from jarring or working loose. This is an important feature of the construction, although, of course, other means can be provided for locking the cap screws in place.

It will be noted that the construction provides effective means for taking both the outward and inward side thrusts of the axles, the thrust members providing a large wearing surface to receive the thrust. The construction is also such that the car wheels will be held to standard gage. The thrust parts being entirely separated from the hub and hub cap can be made of any high grade metal of a character to effectively withstand wear. It will also be noted that there is a certain amount of play between the inner thrust collar and the inner edge of the ring 7. This permits the axle to move up and down more or less to accommodate itself to the wear in the bearings.

I do not desire to limit myself to the particular construction, arrangement and combination of parts which I have shown since it will be obvious that these may be varied in detail, without departing from the spirit and scope of my invention as defined in the appended claims.

I claim:

1. In a mine car wheel, the combination with an axle having a pair of thrust collars thereon, of a hub having a thrust ring secured thereto and extending inwardly between the thrust collars, the two thrust collars being of similar construction and interchangeable one with the other, substantially as described.

2. A mine car wheel having a thrust ring seated against the outer end of the hub body, and a chambered cap seated against said ring, said cap and ring being secured to the body by a plurality of bolts or screws, and locking washers for said bolts or screws and having a non-rotative engagement with the hub cap and with the heads of the bolts or screws, substantially as described.

3. A car wheel having an axle provided with a reduced portion, a pair of thrust collars seated on said reduced portion, said collars being interchangeable one with the other, and the wheel having its hub provided with a thrust ring engaging the space between the collars, substantially as described.

4. A car wheel having an axle provided with a reduced portion, a pair of thrust collars seated on said reduced portion, said collars being interchangeable one with the other, and the wheel having its hub provided with a thrust ring engaging the space between the collars, together with a hub cap chambered on its inner face to receive the thrust members and also to form a lubricant chamber, and the thrust ring having lubricant openings therethrough, substantially as described.

In testimony whereof, I have hereunto set my hand.

FREDERICK A. SWEET.